United States Patent [19]

Vas et al.

[11] Patent Number: 4,496,670
[45] Date of Patent: Jan. 29, 1985

[54] COATED PARTICULATE FILLERS COMPRISES A PHOSPHINIC ACID GROUP-CONTAINING UNSATURATED ORGANIC POLYMER

[75] Inventors: Gerson M. F. Vas, Welling; Leslie E. Shiel, Gravesend, both of England

[73] Assignee: Blue Circle Industries PLC, London, England

[21] Appl. No.: 551,868

[22] Filed: Nov. 15, 1983

[30] Foreign Application Priority Data

Nov. 24, 1982 [GB] United Kingdom ................ 8233574

[51] Int. Cl.$^3$ ............................ C08K 9/00; B32B 5/16
[52] U.S. Cl. .................................... 523/205; 428/402;
428/403; 428/404; 428/407; 523/209
[58] Field of Search ............... 523/205, 209; 428/402,
428/403, 404, 407

[56] References Cited

U.S. PATENT DOCUMENTS

| | | | |
|---|---|---|---|
| 3,966,486 | 6/1976 | King et al. ........................... | 524/539 |
| 4,017,452 | 4/1977 | Schwarz .............................. | 523/205 |
| 4,123,587 | 10/1978 | Wesch et al. ........................ | 428/407 |
| 4,209,430 | 6/1980 | Weber ............................. | 106/308 M |
| 4,251,432 | 2/1981 | Martin ................................ | 428/407 |
| 4,251,436 | 2/1981 | Silberberg ........................ | 106/288 B |
| 4,317,765 | 3/1982 | Gaylord ............................. | 523/205 |

FOREIGN PATENT DOCUMENTS 1603300 11/1981 United Kingdom .

OTHER PUBLICATIONS

Derwent Abs. 80398c/45 (3-1980) SU724537.
Chem. Abs. 83-29296(a) Kurbanov et al. (1973).
Chem. Abs. 87-40465(h) Shagov et al. (1977).

*Primary Examiner*—Herbert J. Lilling
*Attorney, Agent, or Firm*—Brooks Haidt Haffner & Delahunty

[57] ABSTRACT

Filler particles are coated with an adduct of an unsaturated polymer, e.g. polybutadiene, and phosphinic acid groups. The coated filler may be prepared by reacting an unsaturated organic polymer with a phosphorus trihalide and applying the product in the form of a solution or dispersion in an organic solvent to mineral, e.g. calcium carbonate, particles. If liquid, the product may alternatively be applied as such to the mineral particles. In either case, the product so applied is then hydrolyzed in situ in order to form the phosphinic acid groups. The coated filler particles are useful in the reinforcement of elastomers.

21 Claims, No Drawings

COATED PARTICULATE FILLERS COMPRISES A PHOSPHINIC ACID GROUP-CONTAINING UNSATURATED ORGANIC POLYMER

FIELD OF THE INVENTION

The present invention relates to coated particulate fillers and to compositions comprising an organic polymer, especially an elastomer, and such a filler.

BACKGROUND TO THE INVENTION

Synthetic elastomers, e.g. ethylene-propylene terpolymers (EPDM), styrene-butadiene rubber (SBR), and butyl and nitrile rubbers, find widespread use, for instance in sealants, gaskets, conveyor belts and electrical cable insulation. In many of these applications they are preferred to natural rubber because of their superior resistance to degradation by heat, oils, solvents, oxygen and ozone.

Most synthetic elastomers belong to the non-crystallising category and, unlike natural rubber, their gum strength is poor. Useful mechanical properties can be achieved, however, by the addition of a particulate filler that improves the modulus and failure properties of the cured vulcanisate. This phenomenon is known as "reinforcement" and is associated with an increase in modulus, tensile strength and swelling resistance. Significant reinforcement is, in general, manifested only when the filler particles have a high surface area and the elastomer wets the filler.

Hitherto the most important and commonly used reinforcing filler has been carbon black. The so-called 'structured' or reinforcing grades of carbon black are prepared from relatively expensive hydrocarbon feedstocks such as the aromatic fraction of petroleum or natural gas by burning in an oxygen-depleted atmosphere in special furnaces. Moreover, these feedstocks are in demand for the production of monomers (e.g. styrene) and other chemicals. Consequently, because of the competition for these limited hydrocarbon feedstocks, the cost of carbon black has tended to rise steeply. The search for cheaper alternatives to carbon black as a filler has thus been stimulated by the increasing costs of that material.

Synthetic calcium carbonates have attracted interest since their very small ultimate particle size suggests that they may be capable of providing a high degree of reinforcement in elastomer compositions. One advantage of these calcium carbonates is that they can be manufactured by processes that are not energy intensive and that involve raw materials of low cost. Thus, synthetic calcium carbonate of high surface area and of regulated particle size, shape and distribution and crystal structure can be prepared by the carbonation of an aqueous lime suspension. Another advantage is that the use of calcium carbonate as a filler permits the production of coloured or white elastomer composites.

However, in order to achieve adequate reinforcement, there should be a strong interaction between the surface of the filler particles and the elastomer leading to adhesion. Because of the hydrophilic nature of the surface of precipitated calcium carbonates (in contrast to carbon black), adhesion at the filler/elastomer interface is poor.

The surface treatment of precipitated calcium carbonates using stearic acid has been practised for many years. Although such a treatment increases the hydrophobicity of the calcium carbonate surface, the improvement in adhesion at the filler/elastomer interface is not significant and the performance characteristics of stearate-coated grades of precipitated calcium carbonate as rubber-reinforcing fillers are only modest.

In United Kingdom Patent Specification No. 1,603,300 (Imperial Chemical Industries), it is disclosed that the compatibility of a basic particulate filler with an organic polymer can be improved by coating the filler with an organic polymer which contains at least one unsaturated group and a carboxylic acid or carboxylic anhydride group. Such coated fillers are stated to be especially useful as fillers in natural or synthetic rubbers and they are referred to as "rubber-reactive fillers" in the art.

A rubber-reactive filler may be prepared in accordance with the disclosure of the aforesaid United Kingdom Specification by mixing a suspension of precipitated calcium carbonate with the triethylammonium salt of the methyl half-ester of a polybutadiene-maleic anhydride adduct. The reinforcing properties of a precipitated calcium carbonate coated with a carboxylated polybutadiene are discussed by J. Hutchinson and J. D. Birchall, Elastomerics, Volume 112, July 1980, page 17 et seq.

In the Journal of the Japanese Rubber Association (Nippon Gomu Kyokaishi)50, 7 (July 1977), pages 484–491, K. Shomato and co-workers describe the styrene cross-linking of an adduct polymer obtained by the reaction of maleic anhydride and liquid hydroxy-terminated polybutadiene, the cross-linking being effected in the presence of various inorganic fillers. Although the cross-linking reaction was noticeably hindered when carbon black was used as the filler, and the resultant cured elastomer had poor mechanical properties, the reaction proceeded smoothly with calcium carbonate as the filler and the mechanical properties of the resultant cured elastomer were better.

SUMMARY OF THE INVENTION

The present invention now provides a particulate filler which comprises filler particles to the surface of which there has been bound an organic polymer that comprises unsaturated bonds and phosphinic acid groups. (The particulate fillers of this invention are also referred to herein as "coated" fillers. However, this is purely for convenience and is not meant to imply that the particles are necessarily entirely covered with a layer of the unsaturated organic polymer, nor that the layer is necessarily of uniform thickness.)

The invention also provides a process for the production of a particulate filler which comprises binding to the surface of filler particles an organic polymer that comprises unsaturated bonds and phosphinic acid groups. In preferred embodiments of this process, a precursor of the unsaturated polymer is applied to the surface of the particles, the precursor being subsequently converted into the polymer in situ.

The invention further provides a polymer composition comprising a matrix of an organic polymer, especially an elastomer, having distributed therein a particulate filler according to the present invention.

The use of the organic polymers comprising unsaturated bonds and phosphinic acid groups in the surface treatment of filler particles represents a significant departure from the known art, in that the coating polymer comprises inorganic substituent groups as opposed to the organic substituent groups (specifically carboxylic acid or anhydride groups) present in the coating polymers of the prior art.

One advantage of these phosphinic acid group-containing polymers is that they may be bound not only to basic filler particles (for example calcium carbonate) but also to acidic filler particles (for example aluminium silicate) or neutral or amphoteric filler particles (for example aluminium hydroxide). Another advantage is that certain precursors of these organic polymers have been found to have an excellent solubility or dispersibility in several common organic solvents, which facilitates the process of producing the coated filler particles. A further advantage is that, owing to their having a phosphorus content comparable to that of commercially available phosphate-based flame-retardants, the organic polymers may improve the fire resistance or flame retardation characteristics of a polymer composition comprising the coated particulate filler. It may be particularly useful to coat a filler which is known to have flame-retarding properties, for example aluminium hydroxide, with a view to improving the reinforcing and surface characteristics of the filler.

DESCRIPTION OF THE PREFERRED EMBODIMENTS

Any filler may be used, provided that it has a surface to which the phosphinic acid group-containing polymer may be bound. The fillers are, in general, mineral fillers, which may be synthetically prepared or of natural origin. Suitable fillers may be selected from the oxides, hydroxides, carbonates and silicates of alkaline earth metals, titanium, silicon, aluminium and zinc. Specific examples are magnesium carbonate, barium carbonate, zinc oxide, titanium dioxide, magnesium silicate, calcium silicate (for example $\beta$-wollastonite) and kaolin and other forms of aluminium silicate. A particularly preferred filler, however, is calcium carbonate, especially precipitated calcium carbonate. Another useful filler is aluminium hydroxide, $Al(OH)_3$, which is commonly referred to as "aluminium trihydrate" (or "ATH").

Although the particles may have any suitable size and morphology, it is preferred for many applications that they should be substantially spherical, although particles having a laminar, fibrous or acicular shape may be advantageous in some cases. They preferably have a surface area of from 5 to 50 m$^2$/g. Although better reinforcement is obtained at the higher surface areas, there may be an increase in agglomeration; accordingly, a surface area of from 20 to 25 m$^2$/g is especially preferred.

The organic polymer employed as a coating for the particulate filler must comprise unsaturated bonds and these are preferably ethylenically unsaturated bonds ($>C=C<$).

The preferred coating polymers are derived from dienes, especially conjugated dienes, although other classes of unsaturated polymers may be used. Especially preferred are the polymers of dienes of the general formula $$CH_2=CR-CH=CH_2$$

in which R is hydrogen, alkyl, aryl or halogen, particularly preferred examples of which dienes are butadiene, isoprene and chloroprene. The term "polymer" in this context includes homopolymers and copolymers, it being possible, for example, to employ a copolymer of a diene and a vinyl monomer such as styrene.

Although polybutadienes are preferred at present—especially the liquid polybutadienes, as they are usually easier to work with—other suitable polymeric materials from which the coating polymer may be derived include depolymerised natural rubber in liquid form; such a material is commercially available under the trade name Lorival R (from Messrs. Chloride Lorival, Bolton, England). Further polymeric materials of interest are the liquid copolymers of butadiene and acrylonitrile (often referred to as "liquid NBR").

It is preferred that the ethylenically unsaturated bonds be predominantly cis, since cis bonds appear to be more reactive than trans bonds or vinyl bonds to the phosphorus trihalides that are used in the preparation of the coating polymers, as described hereinafter.

The organic polymers used as the coating may be regarded as unsaturated polymer/phosphinic acid group adducts and are believed to contain groups which in the free acid form may be represented thus:

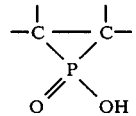

Of course, the free acid may be readily converted into an ester or salt thereof and the expression "phosphinic acid group" is to be construed herein as including such a derivative. Such derivatives include the methyl and ethyl esters and the alkali metal salts, ammonium salts and trialkylammonium salts.

The adducts may be prepared by the reaction of a phosphorus trihalide with an unsaturated organic polymer followed by hydrolysis of the resultant phosphorous-containing group. Although the applicants do not wish to be bound by any theory herein, it is believed that the mechanism of the reaction is as follows:

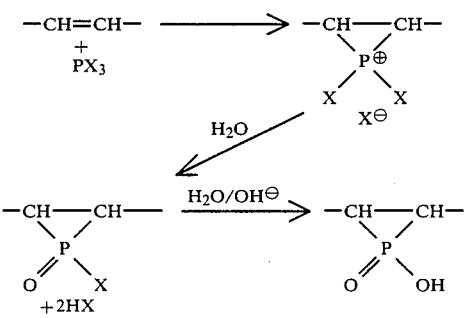

in which X represents a halogen atom, preferably Cl or Br. The preferred reagents are phosphorus tribromide and, especially, phosphorus trichloride.

The reaction of the phosphorus trihalide and the carbon-carbon double bond may proceed through a free radical mechanism. Thus, the reaction may be initiated by irradiating the reaction system with ultraviolet light; however, it is preferred to employ a free radical initiator, for example benzoyl peroxide, as a catalyst.

The reaction is conveniently effected in an inert organic solvent, such as xylene, in an inert atmosphere, such as nitrogen, at a temperature of from 100° to 200°

C. As phosphorus trichloride is very reactive, it may be appropriate not to exceed 150° C. in order to prevent degradation of the polymer by charring. Higher temperatures may also promote foaming, although that can usually be controlled using anti-foaming additives. The catalyst is generally employed in an amount of 3 to 7% by weight of the unsaturated polymer reactant. The reaction system is preferably stirred throughout the course of the reaction, which generally takes 3 to 6 hours. Excess phosphorus trihalide can be removed after the reaction by distilling it off.

Alternatively, the reaction of the phosphorus trihalide with the carbon-carbon double bond may proceed via an ionic mechanism in the presence of a catalyst such as an aluminium trihalide, in particular aluminium trichloride. In general, up to 1 mole of aluminium trihalide and up to 1 mole of phosphorus trihalide are used per mole of olefinic bond. The reaction media, reaction temperatures and other conditions may be the same for the ionic reaction as for the free-radical reaction.

The hydrolysis reaction is preferably effected after the polymer has been applied to the filler, since hydrolysis prior to coating can lead to the formation of a polymeric gel that is difficult to use. Thus, the process of this invention includes embodiments wherein the phosphinic acid groups are formed in situ from appropriate precursor groups.

The adduct, however prepared, should still contain unsaturated bonds when applied to the particulate filler. It is thought that the adduct is bonded to the surface of the filler by means of the phosphinic acid groups. The unsaturated bonds in the adduct are believed to contribute to the adhesion at the filler/elastomer interface in a composite of elastomer and filler by undergoing crosslinking with the elastomer matrix.

The molecular weight of the adduct may vary within wide limits. However, the dispersibility of the adducts and their precursors and the ease with which they can be coated onto the filler particles decrease with increasing molecular weight. Accordingly, it is preferred to employ an adduct having a molecular weight (number average) of from 200 to 15,000 for example 200 to 7,000.

The coating may be applied to the filler particles by any conventional method. Thus, for example, the filler may be brought into intimate admixture with the intermediate adduct (i.e. the phosphonium trihalide salt of the unsaturated polymer) or the adduct, the polymer being in the form of a solution or dispersion in an organic solvent (the term "solvent" here including a dispersing medium). The filler may be initially in the form of a slurry in a suitable organic liquid, if convenient. The mixture may be heated, provided that the temperature does not exceed that at which significant decomposition of the adduct or intermediate adduct occurs.

Suitable organic solvents include aliphatic, aromatic, araliphatic or cycloaliphatic hydrocarbons, e.g. toluene, xylene and petroleum fractions; halogenated hydrocarbons, for example dichloromethane, chloroform, carbon tetrachloride, 1,2-dichloroethane, trichloroethylene and tetrachloroethylene; ethers, for example diethyl ether; and mixtures thereof. Preferred solvents will have low flammability, low toxicity, and a boiling point that facilitates both use and the removal of the solvent from the coated particulate filler.

In some cases, the adduct or intermediate adduct will be liquid at the temperature employed, thereby obviating the need for a solvent. The coating of the filler particles may then also be accomplished by solventless blending ("dry-blending") methods, especially with high-speed mixing.

When the filler has been coated with the intermediate adduct using a solution or dispersion of the latter, hydrolysis of the intermediate adduct may be effected by adding water dropwise with constant stirring, the reaction mixture being kept cool as the hydrolysis reaction is exothermic. In the case of dry-blended material, hydrolysis of the intermediate adduct can be effected, after it has been dispersed throughout the mass of filler, by adding excess water and mixing during the addition and for a period (say 1 hour) thereafter.

It is also possible to apply the polymer/phosphinic acid group adduct (i.e. the hydrolysed coating material) in the form of a dispersion in water, especially with a suitable emulsifier such as an alkyl polyoxyethylene or polyethylene ether or alcohol. The filler to which the dispersion is added may be dry or in the form of a slurry.

An antioxidant is advantageously included in the coating composition to be applied to the filler particles. Where the coating is applied from a dispersion or emulsion, the presence of a dispersant may be employed to stabilize the system.

In general, the amount of adduct bound to the filler particles will be in the range 0.2-25%, preferably 0.2-10%, by weight of the filler.

Should any agglomeration of the particles take place during the coating operation, it may be appropriate to subject the coated filler to milling, for example in a ball mill, in order to break up the agglomerates.

Although the coated fillers of the present invention can be incorporated into a wide variety of organic polymers in order to form composites, it is preferred that the matrix of the composite be selected from elastomeric materials, for example SBR, neoprene, butyl rubber, nitrile rubber, polybutadienes, polyisoprenes, EPDM rubbers and natural rubbers.

The coated fillers of the present invention can be distributed in the polymer matrix by methods customary in the art. In general, up to 300 parts by weight of filler, preferably from 5 to 200 parts, will be employed per 100 parts by weight of matrix polymer. The optimum loading of filler will, however, depend upon the intended use of the composite.

The present invention is illustrated in and by the following specific Examples.

EXAMPLE 1

(a) A 4% by weight solution of polybuta-1,3-diene in xylene was prepared. The polybutadiene had a molecular weight of 2,800 and had terminal hydroxyl groups. The steric composition comprised 1,4-trans bonds 60%, 1,4-cis bonds 20% and 1,2-vinyl bonds 20%.

Phosphorus trichloride was added at room temperature to give a weight ratio of polybutadiene to $PCl_3$ of 1:1.3. The selected level of catalyst was added to the resultant mixture and the temperature was raised to 120° C. The reaction was allowed to proceed, under reflux and with constant stirring, at that temperature for 5 hours. Both the addition $PCl_3$ and catalyst and the reaction were effected under an atmosphere of nitrogen in order to prevent hydrolysis.

Upon completion of the reaction, the resultant intermediate adduct was hydrolysed—by the addition of water dropwise through a dropping funnel with constant stirring in order to frm phosphinic acid groups on the unsaturated polymer.

A series of experiments were carried out, the experiments differing with regard to the nature and amount of catalyst added. The results of these experiments are summarised in the following table, in which the level of catalyst is expressed as a percentage by weight of the polybutadiene, and wherein the "combined phosphate" refers to the amount of phosphorus incorporated into the polybutadiene as a percentage by weight of the total resultant adduct.

TABLE 1

| Catalyst | Level of catalyst | Combined phosphate |
| --- | --- | --- |
| — | 0 | 2.5 |
| benzoyl peroxide | 3 | 9.8 |
| benzoyl peroxide | 5 | 11.6 |
| aluminium trichloride | 5 | 6.7 |

The increased level of combined phosphate (indicative of a higher degree of phosphate substitution) that is achieved using a catalyst suggests that substitution occurs by a reaction not only with the terminal hydroxide groups but also with the double bonds. The infra-red spectrum of the modified polybutadiene (i.e. the adduct) exhibited a lower absorption due to carbon-carbon double bonds than did the infra-red spectrum of the starting material. Furthermore, the infra-red spectrum of the modified polybutadiene exhibited an absorption at $8\mu m$, which indicates the presence of a P→O bond.

The results given in Table 1 indicate that the free radical mechanism achieves a higher degree of substitution of the polybutadiene chain than does the ionic mechanism.

A sample of the polybutadiene/phosphinic acid group adduct having a combined phosphate content of 11.6% could be dispersed in a large volume of water by agitation alone. The resultant emulsion could be rendered stable for four days with the use of a dispersant after which separation gradually occurred.

(b) The intermediate adducts (the $PCl_3$ salts of the polybutadienes) were readily soluble in a number of common solvents. The resultant solution in each case could be used to coat a precipitated calcium carbonate having a mean specific surface area by gas adsorption of 25 $m^2/g$. The intermediate adduct was then hydrolysed by the controlled addition of water with constant stirring to give the polybutadiene/phosphinic acid group adduct. Agglomerates of the coated filler were broken down by ball-milling the dry product. Solvent extraction of the coated material did not yield significant quantities of unreacted material, this indicating that the coating was firmly bonded to the surface of the particulate filler.

EXAMPLE 2

(a) Polybuta-1,3-diene was reacted with phosphorus trichloride in the manner described in Example 1, using benzoyl chloride as the catalyst at a level of 5% by weight of the diene. In this preparation, however, the polybutadiene had a molecular weight of 1,500 and had a steric composition comprising 1,4-cis bonds 72%, 1,4-trans bonds 27% and 1,2-vinyl bonds 1%. The polybutadiene contained no hydroxyl terminal groups.

Analysis of the resultant adduct indicated a level of combined phosphate of 12.9% by weight of the total adduct. This result indicates that an increase in the percentage of cis bonds results in an increase in the substitution of the polybutadiene chain with phosphinic acid groups (compare the results given in Example 1(a)).

(b) Particulate calcium carbonate could be readily coated with the polybutadiene/phosphinic acid group adduct using the following procedure.

The calcium carbonate was slurried in dichloromethane using a vibratory mixer. To the resultant slurry there was added the phosphonium trichloride salt of the polybutadiene, which salt was in the form of a 30% by weight dispersion in dichloromethane, to give a 3% by weight coating of the adduct of the filler surface. The addition was effected dropwise and on completion excess distilled water was added slowly to the slurry, which was constantly stirred to ensure complete hydrolysis of the intermediate adduct.

The coated filler was filtered off, dried in a vacuum oven at 100° C. and then ball-milled in order to break up any agglomerates present.

EXAMPLE 3

The reinforcing characteristics of a precipitated calcium carbonate with a specific surface of 25 $m^2/g$ coated analogously to Example 2 were evaluated, as were (for comparison purposes) the characteristics of an uncoated precipitated calcium carbonate with the same specific surface area.

The rubber chosen for the evaluation was Nordel 1040, an ethylene-propylene terpolymer (EPDM). This is a non-crystallising, inherently low-strength rubber which will clearly illustrate differences in the reinforcing power of fillers. It was particularly suitable for this evaluation since a major use of coated calcium carbonates is in the production of high-strength, low-hardness rubber products. This combination of properties is usually difficult to achieve in a non-crystallising rubber.

FORMULATION

The formulation was kept as simple as possible and oil was not included. It was necessary, therefore, to use a moderate loading of filler and 65 p.h.r. (parts per hundred parts of resin) was selected. The full formulation is given in the following table.

TABLE 2

| Ingredient | Parts by weight |
| --- | --- |
| Nordel 1040 | 100.0 |
| Zinc oxide | 5.0 |
| Stearic acid | 1.0 |
| Sulphur | 1.5 |
| TMTM | 0.5 |
| TMTD | 0.5 |
| MBT | 1.5 |
| Filler | 65.0 |

Notes:
TMTM = Tetramethyl thiuram monosulphide
TMTD = Tetramethyl thiuram disulphide
MBT = 2-mercaptobenzthiazole

COMPOUND PREPARATION

Initially a masterbatch of all ingredients, except filler, was prepared. Mixing was carried out in a "00" Banbury mixer and sulphur was added and dispersed on a 18 in. (45.7 cm) two-roll mill.

Additions of filler to portions of the masterbatch were then made on a 12 in. (30.5 cm) two-roll mill using a standardised mixing technique for a period of ten minutes.

VULCANISATION CHARACTERISTICS

Vulcanisation curves at 160° C. were obtained using a Monsanto Oscillating Disc Rheometer. The oscillating angle employed was 3° and the frequency was 100Hz.

It was found that the nature of the filler had no significant effect on the induction period or the rate of cure of the rubber.

MOULDING OF TEST-PIECES

All test samples were prepared by compression moulding for 22 minutes at 160° C. using a moulding pressure of 0.5 tons/sq. in. (7.72 MPa).

STRESS-STRAIN TESTS

The stress-strain properties of the vulcanisates were determined using an Instron 1026 machine, with type D dumbell test-pieces, in accordance with British Standard B.S. 903: Part A2. Five test-pieces from each compound were tested and the median results are quoted in Table 3 below.

TEAR RESISTANCE TESTS

The tear resistance of the vulcanisates were measured on an Instron 1026 machine using un-nicked angle test pieces as laid down in B.S. 903. Six samples from each compound were tested and the results reported in Table 3 are, in each case, the average of the two middle values, the six results having been classified in order of increasing value.

HARDNESS TESTS

The hardness of each vulcanisate was measured using the Wallace dead-load hardness meter according to B.S. 903. Four measurements were made on each sample and the average result is given in Table 3.

COMPRESSION SET TESTS

Compression set was measured using the 25% constant strain method. The comparison period was 24 hours at 100° C. and recovery was for 30 minutes at room temperature. Four samples of each compound were tested and the average result is quoted in Table 3.

TABLE 3

|  | Precip. $CaCO_3$ | Coated precip. $CaCO_3$ |
|---|---|---|
| Hardness | 56 | 56 |
| Tear resistance (N/mm) | 18.1 | 26.1 |
| Tensile strength (MPa) | 5.0 | 11.1 |
| Stress at 300% elongation (MPa) | 1.8 | 2.4 |
| Elongation at break (%) | 690 | 800 |
| Compression set (%) | 72 | 60 |

Comments
1. The tensile strength of an unfilled EPDM vulcanisate is about 3–4 MPa. It will be noted that the use of the coated precipitated calcium carbonate as a filler gave a significant increase in tensile strength.
2. With regard to the compression set tests, the conditions were severe and the vulcanising system was not selected to give maximum resistance to compression set. The compression set values are, therefore, high but the coated precipitated calcium carbonate gave a significantly better result than did the uncoated material.

EXAMPLE 4

The reinforcing characteristics of the precipitated calcium carbonate of Example 3 coated analogously to Example 2 (with the exception that the adduct coating was reduced to 1% by weight) were compared with the same material prepared by dry blending rather than solvent blending at the reduced coating level and also with a precipitated calcium carbonate coated according to the prior art with a polybutadiene/maleic anhydride adduct at the same coating level.

The rubber formulation was as described in Example 3.

The vulcanisation characteristics of the formulation were not significantly affected by the variations in the filling coating. Test pieces were produced by compression moulding, as described in Example 3. The experimental results are given in the following table:

TABLE 4

|  | Filler produced by: | | |
|---|---|---|---|
|  | Solvent Blending | Dry Blending | Prior Art |
| Stress at 300% elongation (MPa) | 3.1 | 2.9 | 3.0 |
| Tensile Strength (MPa) | 11.1 | 9.8 | 7.5 |
| Elongation at break (%) | 725 | 725 | 575 |

EXAMPLE 5

A particulate mineral filler was coated with a polybutadiene/phosphinic acid group adduct substantially as described in Example 2, except that a dry-blending process was employed. The adduct coating in the coated filler amounted to 1% by weight.

The coated filler was incorporated in a rubber formulation substantially as described in Example 3. Three fillers were tested, namely aluminium hydroxide ("ATH"), magnesium carbonate ($MgCO_3$) and aluminium silicate ($AlSiO_3$). The vulcanisation characteristics of the rubber formulation and the mechanical properties of compression-moulded test pieces were investigated, as described in Example 3. The results are given in the following table.

TABLE 5

| Filler: | $MgCO_3$ | ATH | $AlSiO_3$ |
|---|---|---|---|
| Surface area (m²/g) | 23 | 6 | 110 |
| Vulcanisation characteristics | | | |
| Cure time at 160° C. (min) | 27.5 | 28.5 | 30 |
| Induction period (min) | 2 | 2 | 2 |
| Maximum torque (Nm) | 7.46 | 7.85 | 9.72 |
| Minimum torque (Nm) | 1.69 | 1.36 | 2.71 |
| Mechanical properties | | | |
| Tensile strength (MPa) | 10.5 | 8.2 | 12.2 |
| Stress at 300% elongation (MPa) | 4.8 | 2.8 | 4.1 |
| Elongation at break (%) | 690 | 690 | 720 |

The results indicate inter alia that the surface treatment of ATH (which is normally non-reinforcing) in accordance with this invention imparts semi-reinforcing properties to the filler, whereby it can be considered as an additive to polymeric composites for use, for example, in gaskets and conveyor belts. Although the grade of ATH tested has a low surface area, it is considered that ATH having a surface area of 20–25 m²/g would be used in practice.

What we claim is:

1. A particulate filler which comprises filler particles to the surface of which there is bound a phosphinic acid group-containing unsaturated organic polymer.

2. A filler according to claim 1, characterised in that the filler particles are selected from the oxides, hydroxides, carbonates and silicates of the alkaline earth metals, titanium, silicon, aluminium and zinc.

3. A filler according to claim 2, characterised in that the filler particles are of calcium carbonate.

4. A filler according to claim 2, characterised in that the filler particles are of aluminium hydroxide.

5. A filler according to claim 1, characterised in that the organic polymer is ethylenically unsaturated.

6. A filler according to claim 1, characterised in that the said organic polymer is a phosphinic acid group-containing polymer of a diene having the general formula $$CH_2=CR-CH=CH_2$$

in which R is hydrogen, alkyl, aryl or halogen.

7. A filler according to claim 6, characterised in that the organic polymer is a phosphinic acid group-containing polybutadiene.

8. A filler according to claim 1, characterised in that the said organic polymer has a number-average molecular weight in the range from 200 to 15.000.

9. A filler according to claim 5, characterised in that at least 50% of the unsaturated bonds in said polymer are cis-bonds.

10. A filler according to claim 1, characterised in that the phosphinic acid groups in said polymer are in the free acid form or in the form of an ester or salt.

11. A process for the production of a particulate filler which comprises binding to the surface of filler particles a phosphinic acid group-containing unsaturated organic polymer.

12. A process according to claim 11, characterised in that there is applied to the surface of the filler particles a precursor of the organic polymer, the said precursor being the reaction product of an unsaturated organic polymer and a phosphorus trihalide, the said precursor after application to the filler particles being subjected to hydrolysis to produce the phosphinic acid groups.

13. A process according to claim 12, characterised in that the said phosphorus trihalide is phosphorus trichloride.

14. A process according to claim 11, characterised in that the organic polymer is applied to the surface of the filler particles in the form of a solution or dispersion in an organic solvent.

15. A process according to claim 12, characterised in that the said precursor of the organic polymer is applied to the surface of the filler particles in the form of a solution or dispersion in an organic solvent.

16. A process according to claim 11, characterised in that the organic polymer is liquid and is applied in the substantial absence of a solvent to the surface of the filler particles.

17. A process according to claim 12, characterised in that the said precursor of the organic polymer is liquid and is applied in the substantial absence of a solvent to the surface of the filler particles.

18. A polymer composition comprising a matrix of an organic polymer having distributed therein a particulate filler according to claim 1.

19. A polymer composition according to claim 18, characterised in that the matrix comprises an elastomeric material.

20. A polymer composition according to claim 19, characterised in that up to 300 parts by weight of filler are present per 100 parts by weight of matrix polymer.

21. A process according to claim 11, characterised in that the phosphinic acid groups in said polymer are in the free acid form or in the form of an ester or salt.

* * * * *

UNITED STATES PATENT AND TRADEMARK OFFICE
CERTIFICATE OF CORRECTION

PATENT NO.  : 4,496,670
DATED       : January 29, 1985
INVENTOR(S) : GERSON M.F. VAS et al It is certified that error appears in the above-identified patent and that said Letters Patent is hereby corrected as shown below:

Col. 5, line 44, "any conventional method." should read --any convenient method."

Col. 8, line 11, "adduct of the filler surface." should read --adduct on the filler surface.--

Col. 11, line 18
In The Claims:   "200 to 15.000." should read --200 to 15,000.--

Signed and Sealed this

Sixteenth Day of July 1985

[SEAL]

Attest:

DONALD J. QUIGG

Attesting Officer     Acting Commissioner of Patents and Trademarks